US006023833A

United States Patent [19]

Jacobsmeier

[11] Patent Number: 6,023,833

[45] Date of Patent: Feb. 15, 2000

[54] TOOL FOR INSTALLATION AND REMOVAL OF FASTENER CLIPS

[76] Inventor: Ernest G. Jacobsmeier, 426 5th St., West Point, Iowa 52656

[21] Appl. No.: 09/239,255

[22] Filed: Jan. 29, 1999

[51] Int. Cl.[7] ...................... B23P 11/02

[52] U.S. Cl. ...................... 29/450; 29/243.56; 81/420

[58] Field of Search ...................... 29/450, 243.56, 29/267, 270, 278, 268, 239; 81/420; 254/28

[56] References Cited

U.S. PATENT DOCUMENTS

| | | |
|---|---|---|
| 573,313 | 12/1896 | Tiner . |
| 636,587 | 11/1899 | Sylvester . |
| 1,866,771 | 1/1932 | Johnson . |
| 3,315,341 | 4/1967 | Lara . |
| 4,136,589 | 1/1979 | Kerr . |
| 4,658,489 | 4/1987 | Johnston . |
| 4,787,236 | 11/1988 | West . |
| 4,890,519 | 1/1990 | Le Duc . |
| 4,922,770 | 5/1990 | Dlugolecki . |
| 4,957,020 | 9/1990 | Monceret . |
| 4,982,630 | 1/1991 | Schmode . |
| 4,989,479 | 2/1991 | Anderson . |
| 4,999,899 | 3/1991 | Sawyer ...................... 29/243.56 |
| 5,193,336 | 3/1993 | King . |
| 5,391,181 | 2/1995 | Johnson . |
| 5,473,804 | 12/1995 | Rush . |
| 5,611,519 | 3/1997 | Garcia . |

*Primary Examiner*—P. W. Echols
*Assistant Examiner*—John C. Hong
*Attorney, Agent, or Firm*—Keith Frantz

[57] ABSTRACT

A tool is adapted to simultaneously grab a fastener clip, draw the tongue of the clip in a direction away from an opposing leg to establish a clearance condition for installation and removal of the clip from the edge of a piece of sheet metal, and support the clip to prevent bending of the legs of the clip. The tool includes a pair of opposing jaws connected for movement toward and away from one another with actuating means such as associated handles. One jaw is formed with a surface to establish a fulcrum with the connected end of the tongue, and an operative end adapted to grab the free end of the tongue. The other jaw includes a cam surface for supporting the opposite end of the leg to which the tongue is connected. The jaws cooperate to effect separation of the tongue and the opposing leg of the clip to establish the clearance condition as the handles are squeezed together.

17 Claims, 7 Drawing Sheets

TOOL FOR INSTALLATION AND REMOVAL OF FASTENER CLIPS

BACKGROUND OF THE INVENTION

1. Field of Invention

The present invention relates generally to tools, and more particularly to tools adapted to assist in the installation and removal of U-nut fastener clips.

2. Description of the Prior Art

U-nut fastener clips enable the use of threaded fasteners for connecting an object to sheet metal or other sheet material. A U-nut clip is typically made from spring steel or other resilient metal, and is formed with a base portion and a pair of spaced legs extending therefrom to define a generally U-shaped body. A tongue, resiliently connected to one of the legs, is formed with a bend or elbow portion which extends toward the second leg, and a centrally located clearance hole. A threaded barrel aligned with the clearance hole in the tongue extends from the second leg for receiving a threaded fastener. U-nuts of this general type are shown in, for example, Peterson et al., U.S. Pat. No. 4,729,706, and Peterson et al., U.S. Pat. No. 4,897,005.

As discussed in the Peterson patents, U-nut fastener clips are typically designed for ease of installation, for pressing the clip onto the sheet metal with the legs straddling the edge of the sheet metal. As the clip is pushed into position, the tongue flexes away from the second leg, slides along the face of the edge, and then snaps back as the elbow aligns with and snaps into a clearance hole formed in the sheet metal to retain the clip in position.

As a consequence of the desire for ease of installation and the resulting construction of U-nut fastener clips, removal of such clips may be difficult as the elbow must be drawn and maintained from engagement with the clearance hole as the clip is slipped on the edge of the sheet metal. Typically, the blade of a screwdriver, or the tip of a relatively narrow or pointed tool, is inserted between the sheet metal and a portion of the tongue such as the free end of the tongue to pry the tongue away from the sheet metal. The U-nut is then pushed or pulled off the sheet metal, while continuing to pry the tongue from the sheet metal to prevent the tongue from snapping back into the clearance hole. In certain instances, a clip may be removable by pressing on the pry tool in the direction toward the edge of the sheet metal while simultaneously prying the tongue from the clearance hole in the sheet metal. However, this method presents a danger that the clip will "spring" from the sheet metal as it is pressed off the edge, or that the clip will fall into an unreachable or generally undesirable location. Therefore, safe, controlled removal of U-nut fastener clips with such tools typically requires the use of two hands, one to pry the tongue from the sheet metal, and the other to simultaneously pull the clip from the edge of the sheet metal. Thus, removal of U-nut fastener clips can be particularly difficult where the clip is located in cramped quarters, or in difficult-to-reach places, because of the need to typically use two hands.

The inventor is aware of no tool that is especially adapted for removal of U-nut fastener clips. The only prior tool adapted for use with any type of fastener clip that the inventor is aware of is a pliers-like hand tool sold under the name PODNEY pliers by Steck Manufacturing Co. of Dayton, Ohio for removing J-nut fastener clips. J-nut clips are formed with a base and a pair of spaced legs extending therefrom, with one leg being typically formed at about one-half the length of the other leg to define a generally J-shaped body. The threaded barrel extends from the longer leg, and the shorter leg is formed with a free end raised or extending toward the longer leg to restrict the clearance between the legs and to be received into the clearance opening in the sheet metal to retain the clip in position.

The PODENY pliers includes one jaw formed with a U-shaped notch for receiving the base of a J-nut fastener clip, and an opposing jaw formed with a tip aligned with the notch in the other jaw. To remove a J-nut clip with the PODNEY pliers, the tip is positioned between the free end of the shorter leg and the sheet metal, and the notch is aligned with base of the clip. The handles are then squeezed together to clamp the clip between the jaws, and rotated about the base of the clip to twist the free end of the shorter leg from the clearance hole in the sheet metal for removal of the clip.

However, the PODENY pliers is not particularly useful in connection with removing U-nut fastener clips because use of the tool would require the user to bend the leg to which the tongue is connected to release the clip from the sheet metal. A primary deficiency with this approach is that, the tongue, not the base, of a U-nut clip is designed to flex during installation and removal, and the base of the U-nut clip is typically relatively stiff to help maintain the clip in place on the sheet metal. Thus, substantial twisting torque would need to be applied to the handles of the PODENY tool to release the tongue from the sheet metal. Use of the PODENY pliers can also result in substantial friction that must be overcome during removal of the clip because the leg to which the barrel is attached reacts the twisting force of the tool against the sheet metal. In addition, the PODENY pliers tends to be a relatively long tool to assist in developing the relatively high torque needed to bend fastener clips about the relatively stiff base for removal of such clips. For these reason, use of the PODENY pliers can be awkward and difficult in connection with U-nut clips, in many instances is no easier than conventional two-handed removal of a U-nut clip with a pointed tool, and is generally of no assistance in cramped locations or locations for which clear access is not available to the tongue side of the clip.

Thus, there is a need for a tool adapted to assist with removal of U-nut fastener clips, and particularly for a hand tool adapted to assist with safe and easy one-handed removal of such clips, even though the clips may be located in difficult to reach places.

SUMMARY OF THE INVENTION

The general aim of the present invention is to provide a new tool uniquely adapted to assist in ease of removal of fastener clips, including a pliers-like hand-tool for one-handed removal of such clips.

A detailed objective is to achieve the foregoing by providing a tool adapted to draw and hold the tongue of a fastener clip in a clearance position away from the sheet metal without separating the legs of the fastener clip from one another and without creating additional friction between the fastener clip or tool and the sheet metal.

Another detailed objective of the invention is to provide a tool capable of grabbing and holding the clip while simultaneously drawing and holding the tongue away from the sheet metal so that the clip can be quickly and easily slipped onto and off of the edge of the sheet metal while clamped in the tool.

These and other objectives and advantages of the invention will become more apparent from the following description when taken in conjunction with the accompanying drawings.

Briefly, a preferred tool according to the invention includes a pair of opposing jaws operably connected together to draw the tongue from the clearance hole in the sheet metal and maintain the tongue in such clearance position while supporting the leg to which the tongue is connected on opposite sides thereof to prevent the leg from bending and to prevent the introduction of additional friction between the clip and the sheet metal.

More specifically, a preferred tool includes:—a first jaw adapted to simultaneously (i) grab the free end portion of the tongue and (ii) engage the connected end portion of the tongue, or the portion of the leg adjacent thereto, to support the free end of the leg and to establish a fulcrum point about which the tongue can pivot;—a second jaw adapted to support the opposite end of the leg adjacent the closed end of the fastener clip; and—actuating means connecting the jaws so that the first jaw pivots the tongue about the fulcrum to draw and hold the tongue in a clearance position with the sheet metal, or alternately to effect relative pivoting between the tongue and the clip body about the fulcrum and establish a clearance position between the tongue and the sheet metal, as the jaws are actuated toward one another to assist in ease of removal of fastener clips.

In carrying out the invention, the first jaw is provided with (i) a tongue-receiving/engaging end portion having a tab or other suitable means for grabbing the free end portion of the tongue for movement away from the sheet metal, and (ii) an outwardly facing surface positioned and shaped to establish the fulcrum between the end of the first jaw and the connected end portion of the tongue, the fulcrum-establishing surface preferably being formed with a generally convex curvature to provide for a rolling fulcrum about which the first jaw can pivot and to promote use of the tool with clips of different sizes and having tongues of different lengths.

In further carrying out the invention, the second jaw is formed with a cam surface positioned to support the leg to which the tongue is connected on the opposite side of the tongue, proximate the base portion of the clip. Advantageously, supporting this lower leg on opposite sides of the tongue prevents it from bending with respect to the other leg, and thus prevents the introduction of additional friction between the clip and the sheet metal associated with the use of certain prior tools as the tongue is released from the sheet metal, further contributing to the ease of installation and removal of the fastener clip.

In preferred embodiments, the jaws are further adapted for clamping onto and holding the clip therebetween as the tongue is drawn away from and held in a clearance position with the sheet metal. Advantageously, such an arrangement also assists in ease of installation of fastener clips since a clip can be held between the jaws with the tongue maintained in a clearance position with the sheet metal to provide for essentially frictionless movement of the clip in either direction on the sheet metal.

A pliers-like hand-tool according to the invention includes the pair of opposing jaws and a pair of associated handles pivotally connected such that the jaws approach one another as the handles are squeezed together. In a preferred embodiment: the pivot connection is located between the jaws and the handles; the first jaw extends generally radially from the pivot and then curves generally circumferentially toward the second jaw to define the fulcrum-establishing surface and such that the tongue-engaging tab is located at the end proximate and generally facing the second jaw; and the second jaw extends generally radially from the pivot to approximately the radial distance of the fulcrum surface of the first jaw, with the cam support surface extending therefrom inwardly, preferably with a slight outwardly facing concave curvature, to a location radially inwardly of the arc defined by the tab as it pivots about the pivot connection and generally between the end of the first jaw and the pivot such that the tab approaches the cam surface as the handles are squeezed together.

With this arrangement, a fastener clip can be removed from a piece of sheet metal by first positioning the tab of the first jaw between the sheet metal and the free end portion of the tongue, with the fulcrum-establishing surface of the first jaw engaging the connected end portion of the tongue, or the free end of the leg connected thereto, squeezing the handles to first bring the cam surface of the second jaw into supporting engagement with the base of the clip and to generally clamp the clip between the jaws, continuing to squeeze the handles to effect separation of the tongue from the sheet metal as the first jaw pivots about the fulcrum, and then slipping the clip off the edge of the sheet metal while maintaining the squeezing pressure on the handles.

In certain alternate embodiments, the jaws are located between the pivot connection and the handles, and the handles are oriented to enable installation and removal of fastener clips located in difficult to reach places for which access may be restricted. In these instances, the fulcrum-establishing surface and tongue engaging tab of the first jaw, and the cam surface of the second jaw are oriented for use with jaws located between the pivot and the handles, but are operably interchangeable with the above-described arrangement for holding a clip and effecting relative pivoting of the tongue and the clip body to establish a clearance position with the sheet metal. These and other embodiments are shown in the drawings and discussed further below.

Figure 3:
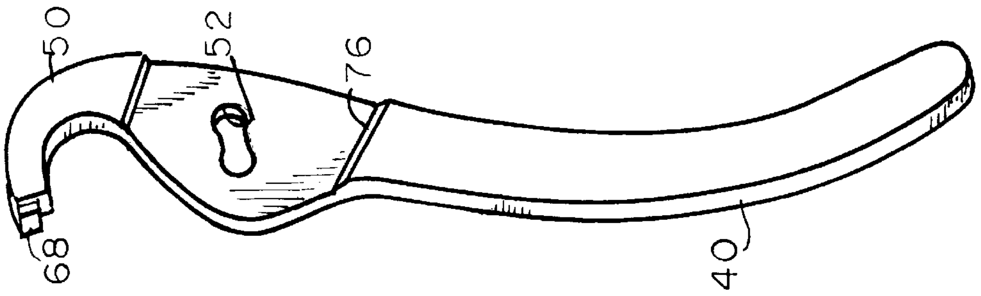
FIGS. 2 and 3 are front and rear perspective views of right and left jaws, respectively, and associated handles, of the hand tool shown in FIG. 1.
Figure 2:
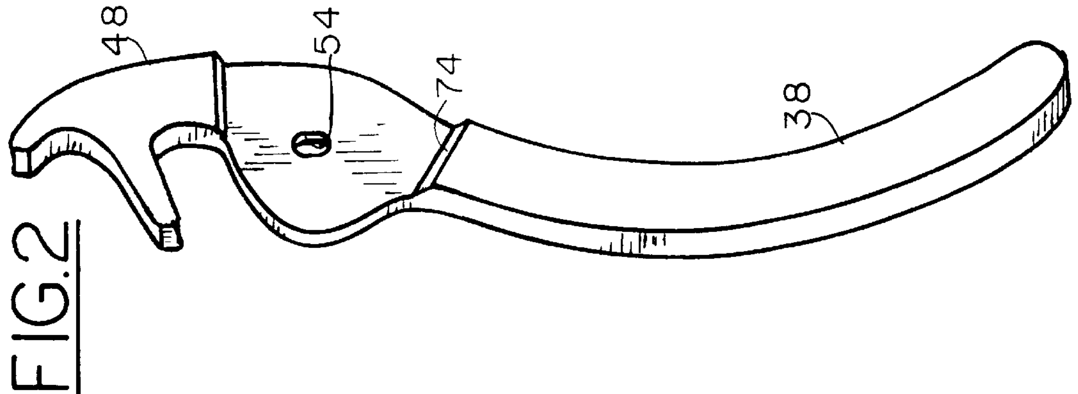

While the invention is susceptible of various modifications and alternative constructions, certain illustrated embodiments have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DETAILED DESCRIPTION OF PREFERRED EMBODIMENTS OF THE INVENTION

Figure 1:
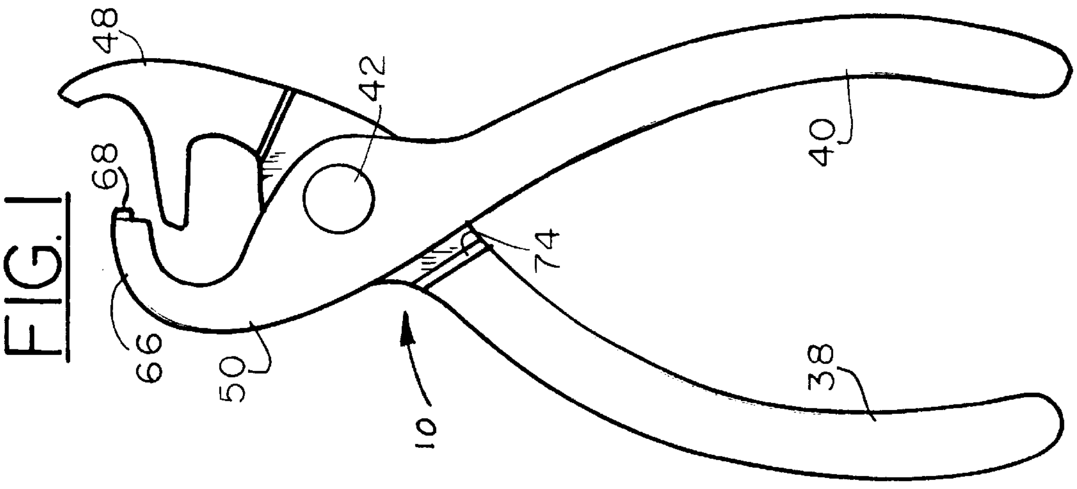
FIG. 1 is a front view of a hand-tool for installing and removing fastener clips, the tool shown incorporating the unique aspects of the present invention.

For purposes of illustration, one embodiment of the present invention is shown in the drawings as a pliers-like hand tool 10 (FIG. 1) adapted to assist in the installation and removal of fastener clips such as a U-nut fastener clip 12 (FIG. 4) from the edge of a piece of sheet metal 14. Three alternate embodiments of hand tool according to the invention are also shown in FIGS. 7–8, 9–10, and 11, and are discussed herein.

U-nut fastener clips are typically made from a resilient material such as spring steel, and are formed having a generally U-shaped body defined by a base or closed end 16, and upper and lower legs, 18 and 20, respectively, spaced to straddle the edge of the sheet metal 14. Located in an opening 24 in the lower leg is a tongue 22that has a free end portion 26 proximate the base 16 of the clip, is formed with a generally centrally located opening 30 and a raised elbow portion 32 extending toward the upper leg to restrict the clearance space between the legs, and is integrally connected near the free end of the lower leg at approximately 28 for resilient bending toward and away from the upper leg. As the clip is slipped onto the edge of the sheet metal, the tongue flexes away from the upper leg, and then snaps back into a clearance hole 34 formed in the sheet metal to retain the clip in place. A threaded barrel 36 extends from the upper leg for receiving a threaded fastener (not shown) to secure a part (not shown) to the sheet metal, the threaded barrel being aligned with the opening 30 in the tongue and the opening 34 in the sheet metal to provide axial clearance for the threaded fastener to extend through.

For purposes of describing the invention, reference is made herein to directional terms such as clockwise, counterclockwise, up, down, left, right, upper, lower, underside, raise, lower, etc. Such directional terms, however, are to be taken only with reference to the orientation and views shown in the drawings, and are not intended to limit the scope of the invention since, as will become apparent, such directional restrictions have no effect on the invention or use thereof, and orientation of a tool according to the invention will depend on the configuration of the tool and orientation of the sheet metal and fastener clip with which the tool is used.

In general, the hand tool 10 includes a pair of opposing jaws, 48 and 50, and associated handles, 38 and 40, respectively, sized to be grasped in a user's hand and pivotally connected at 45, such as with threaded fastener 42, washer 44, and threaded nut 46, such that the jaws generally approach one another as the handles are squeezed together.

In accordance with one aspect of the present invention, the jaws 48 and 50 are uniquely adapted to simultaneously grab the tongue 22 of the clip 12, support the lower leg 20 on opposite sides thereof, and effect separation of the tongue and the upper leg 18 as the handles 38, 40 are squeezed together to provide clearance with the sheet metal for ease of one-handed removal of the clip.

More specifically, the left jaw 50 (as viewed in FIGS. 1 and 3–6) is provided with (i) means for grabbing or hooking the free end portion 26 of the tongue 22, and (ii) means for simultaneously engaging the underside of the connected end portion of the tongue, or the free end of the lower leg portion proximate thereto, to support the free end of the lower leg 20 and to establish a fulcrum 28 about which the left jaw and tongue can pivot with respect to the body of the clip 12; and the right jaw 48 is provided with means for engaging the base 16 of the clip 12, or the lower leg 20 proximate thereto, to provide for pivoting of the clip body, and thus the upper leg, about the fulcrum independently of the left jaw and the tongue.

In carrying out the invention, the operative end portion of the left jaw 50 is formed having a thickness sized to slip into the opening 30 in the tongue 22, and is provided with (i) a tongue-engaging end adapted to "grab" the free end portion 26 of the tongue, and (ii) an outwardly facing surface 66 positioned between the pivot 45 and said tongue-engaging end, the surface 66 being shaped to engage the underside of the connected end portion of the tongue to establish the fulcrum 28 between the clip and the left jaw. The fulcrum-establishing surface 66 of the left jaw 50 is preferably formed having a relatively smooth, generally convex curvature to establish a rolling fulcrum with the lower leg 20 as the left jaw pivots, and to provide for an operative curvature length along which a fulcrum may be established with clips of different sizes and having tongues of different lengths.

For purposes of grabbing the free end 26 of the tongue 22, the end of the left jaw 50 includes a (generally downwardly facing) first surface 58 and a second offset surface 62 (generally facing the right jaw 48) that cooperate to engage surface 60 (generally facing the upper leg 18) and surface 64 or the edge therebetween (generally facing the connected end of the tongue) of the free end portion 26 of the tongue 22, respectively, such that the end of the left jaw "grabs" the tongue for movement in a direction away from the upper leg and in a direction toward the base of the clip.

In the embodiment shown, the operative end of the left jaw 50 is formed with a relatively small tab 68 (i) having lower surface 58 extending from face 62, (ii) sized to be slidably received between the free end portion 26 of the tongue 22 and the sheet metal 14, and (iii) preferably shaped and sized for a relatively snug fit with the end of the tongue. It will be apparent that the operative end of the left jaw may also be formed in alternate embodiments that grab the tongue for movement within the scope of the invention such as with a slot (not shown) having surfaces 58 and 62, or functional equivalents thereof, and sized to slidably receive the free end portion of the tongue.

In further carrying out the invention, the right jaw 48 is formed with a cam surface 70 adapted to engage and preferably slidably support the lower leg 20 at the base 16 of the clip 12. A preferred cam surface extends generally along a plane or an arc that extends from radially outwardly of the arc defined by the tab 68 as it pivots about 45, to a position radially inwardly thereof, to insure that the tab pivots in a direction generally toward the lower leg and thus away from the upper leg 18 as the handles 38, 40 are squeezed together. The preferred cam surface is further oriented so the body of the clip rotates around the fulcrum 28 to effect separation of the upper leg and the tongue as the handles are squeezed together and the cam surface pivots about the fulcrum. To this end, the cam surface 70 shown extends from a position radially outwardly of the arc defined by the tab as it pivots about 45 to a position radially inwardly such that the tab 68 approaches the cam surface as the handles are squeezed together.

Figure 4:
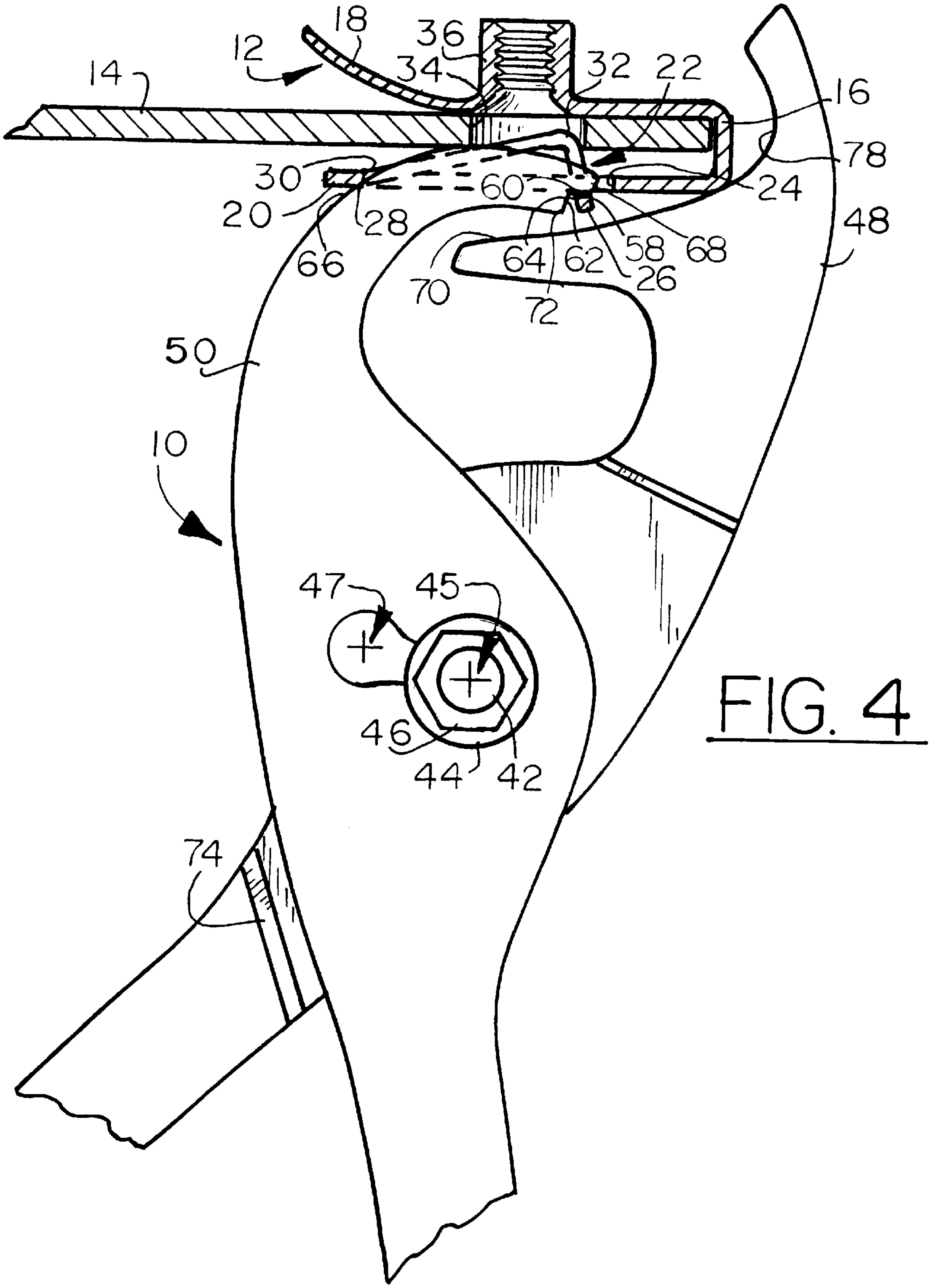
FIGS. 4–6 are enlarged fragmentary views showing the tool of FIG. 1 and a fastener clip in three successive positions during removal of the clip.
Figure 5:
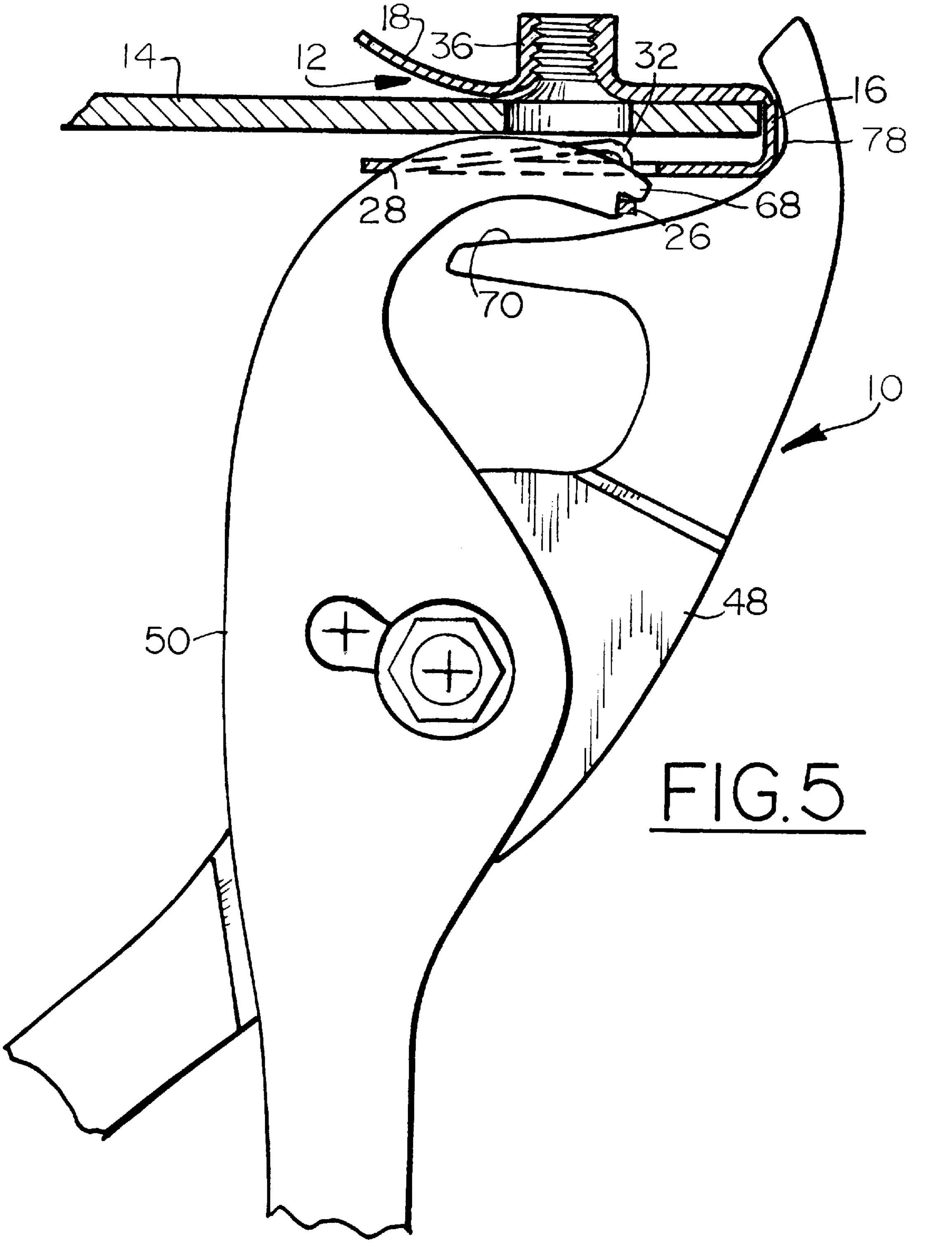
Figure 6:
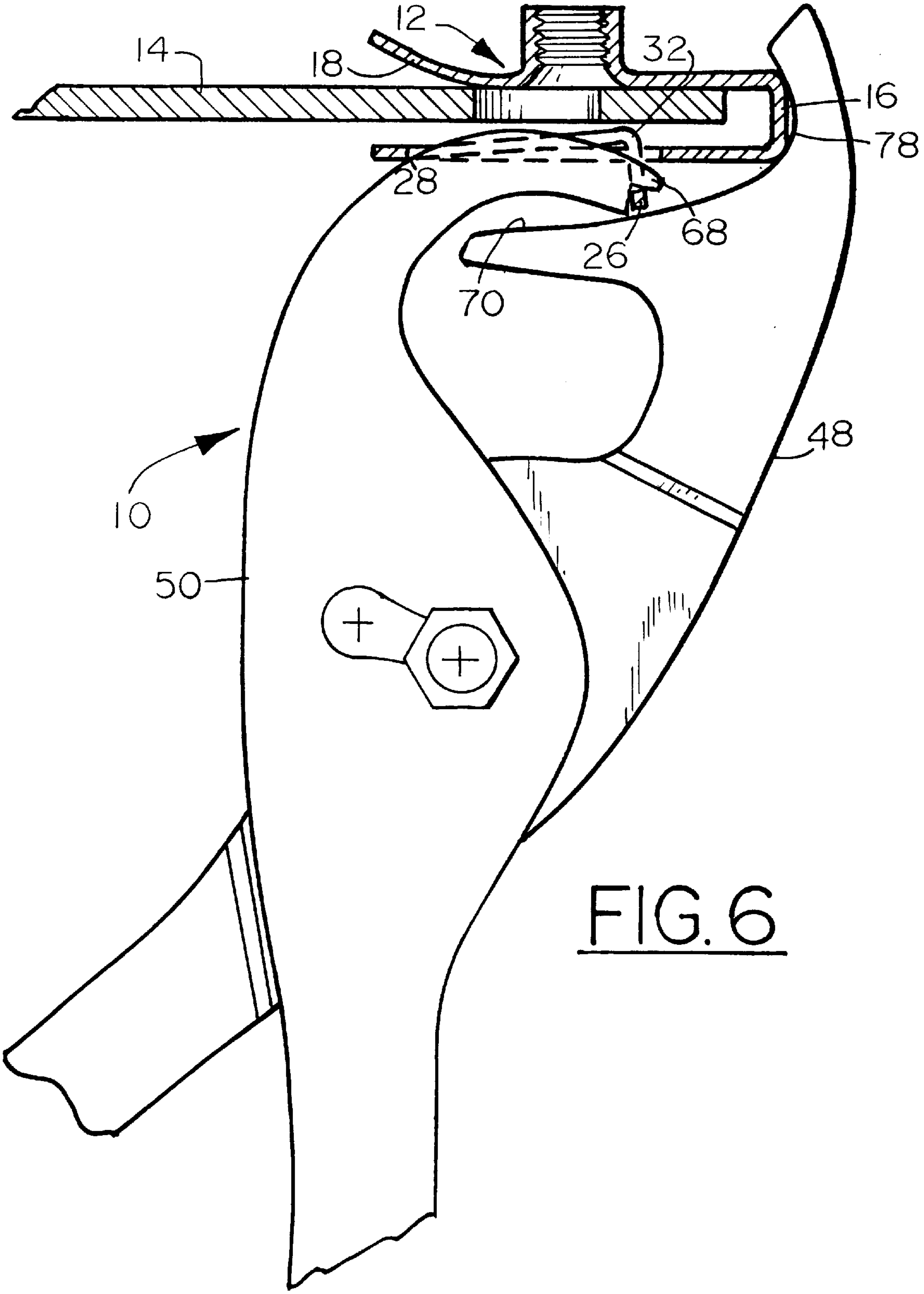

With the foregoing arrangement, the clip 12 may be removed from the sheet metal 14 by first grasping the handles 38, 40 of the tool 10 in one hand, positioning the tab 68 of the left jaw 50 into engagement with the free end 26 of the tongue 22 and the fulcrum establishing surface 66 into supporting engagement with the connected end of the tongue at 28, and squeezing the handles to rotate the cam surface 70 of the right jaw 48 into supporting engagement with the base 16 of the clip 12 as shown in FIG. 4. At this point, squeezing the handles further either (i) drives the base of the clip upwardly on the cam surface, causing the body and upper leg 18 to pivot upwardly or in a counter-clockwise direction (as viewed in FIGS. 4–6) about the fulcrum 28 and away from the tongue, or (ii) drives right jaw downwardly along the cam surface, causing the entire tool to pivot about the fulcrum in a clockwise direction, and thus rotating the free end of the tongue downwardly from the upper leg as the left jaw pivots clockwise about the fulcrum, or (iii) a combination thereof. In either event, as a result of simply squeezing the handles, the jaws separate the tongue and the upper leg, and provide for withdrawal of the tongue from the opening 34 as shown in FIG. 5. The clip may then be slipped from the edge of the sheet metal (FIG. 6) by maintaining the squeezing pressure on the handles, or maintain such pressure at least until the elbow 32 is past the opening 34 in the sheet metal.

The actual pivoting action that occurs between the tool 10 and the clip 12 upon squeezing the handles 38, 40 will depend on the extent to which the body of the clip is free to pivot on the edge of the sheet metal 14, the extent to which the tool is held stationary from pivoting by the user, and tool geometric and clip material considerations. For example, if the clearance between the legs 18, 20 and the sheet metal is relatively small such that the clip is essentially fixed from pivoting, squeezing the handles will cause the entire tool to pivot clockwise about the fulcrum 28 as the cam surface 70 slides downwardly along the base 16 of the clip. Alternately, if there is space between the clip and the sheet metal for the clip to pivot, and if the tool is held relatively stationary by the user as the handles are squeezed, the effect of the cam surface as it pivots about 45 will pivot and lift the body of the clip about the fulcrum in a counter-clockwise direction. In this instance, removal of the clip from the sheet metal requires that the tool and the entire clip be manually rotated in a clockwise direction after the handles are squeezed together to achieve the relative positions shown in FIG. 5, and to provide maximum clearance between the tongue and the sheet metal for removal of the clip. And if both the clip and the tool are free to pivot about the fulcrum, the tongue and the upper leg will separate with a combination of the tongue pivoting in one direction (clockwise) and the body pivoting in the other direction (counter-clockwise) as the handles are squeezed together. Therefore, it is apparent that pivoting of the tongue about the fulcrum, and pivoting of the body about the fulcrum, are functionally equivalent, interchangeable, and substantially indistinguishable actions with regard to the present invention.

In accordance with another aspect of the invention, the tool 10 is adapted to clamp and hold the clip 12 between the jaws 48, 50 as the handles 38, 40 are squeezed together and as the tongue 22 is drawn into and held in a clearance position with the sheet metal 14. With the ability to maintain a clearance position between the clip and the sheet metal, the tool provides for ease of sliding the clip in both directions on the sheet metal, to assist in one-handed installation as well as removal of the clip.

In carrying out this aspect of the invention, (i) the operative end portion of the left jaw 50, and more specifically the shape, size, orientation and dimensional relationship of the fulcrum-establishing surface 66 and the tab 68 are established such that the tab imparts a force on the free end portion 26 of the tongue 22 having a lateral vector component generally parallel to the lower leg 20 and in a direction away from the fulcrum 28 (generally to the right as viewed in FIGS. 4–6) as the handles 38, 40 are squeezed together, as well as having a (generally downwardly directed) force vector component to draw the tongue from the upper leg, and (ii) the cam surface 70 of the right jaw 48 is shaped to react the lateral force component from the left jaw with an equal and oppositely directed force vector component (generally to the right) such that the lateral forces clamp the clip between the jaws as the handles are squeezed together. The fulcrum-establishing surface, the tab, and the cam surface generally shaped and positioned as previously described and as generally shown in FIGS. 1–6 provides the desired clamping forces on the clip.

With this arrangement, the clip 12 may be installed by first positioning the clip in the tool, squeezing the handles 38, 40 to drive the base 16 of the clip up the cam surface 70 and establish clearance between the tongue 22 and the upper leg 18, sliding the clip into position on the sheet metal, and simply then relaxing the squeeze on the handles whereupon the tongue resiliently springs into engagement into the hole 34 in the sheet metal. Thus, the clip is more quickly and easily installed onto the sheet metal, as compared with the conventional method of pressing the clip into position, by eliminating the friction normally present between the clip and the sheet metal. And after a clip has been removed from the sheet metal, it can be held in the tool with the maintenance of a slight gripping pressure on the handles until such time as it is convenient for the user to remove the clip from the tool, thus reducing the possibility that the clip will spring off the edge of the sheet metal, or fall to the floor or into another undesired location after removal from the sheet metal as may occur using prior tools and methods of removal of fastener clips.

In accordance with yet another aspect of the invention, and as further shown in FIGS. 1–6, the cam surface 70 in certain preferred embodiments is shaped with a concave curvature with respect to the direction of approach of the tab 68 such that the slope of the cam surface increases in the direction of movement of the base 16 of the clip 12 as the handles are squeezed together. The increasing slope provides an increasing reaction force component in the direction of the fulcrum as the tongue 22 is drawn from the upper leg 18 (a) for improved clamping between the jaws during installation and removal of the clip, (b) to assist in limiting the movement of the tongue to prevent stressing of the integral junction between the tongue and the lower leg beyond its elastic material limit, and (c) to reduce the handle stroke necessary to effect separation of the tongue and the upper leg for a particular sized clip.

To further promote use of the tool with clips of different sizes, the left handle 50 of the embodiment shown is formed with an enlarged opening 52 for a conventional two-position slip-joint between jaws and handles. In cooperation moving the pivot to 47 (FIG. 4) brings the tab 68 closer to the cam surface for use with generally smaller clips than with the pivot at 45.

Further with regard to limiting the stroke of the tongue 22, it is noted that there is an angular relationship between the jaws 48, 50 and certain clip sizes at which the force component drawing the tongue downwardly from the upper leg (or driving the base 16 upwardly on the cam surface 70) approaches zero, and the entire squeezing force on the handles is transferred to lateral forces clamping the clip between the jaws. At this point, further squeezing of the handles will result in no additional separation of the tongue and the upper leg. Accordingly, in certain preferred embodiments, the shape, size, orientation and dimensional relationship of the fulcrum-establishing surface 66, the tab 68, and the cam surface 70 are optimized such that, for at least certain sized clips, the separation force between the tongue and the upper leg will reach zero, and the maximum clamping force will be reached, prior to reaching a material yield condition of the integral connection between the tongue and the lower leg.

Limitation of the stroke separating the tongue 22 and the upper leg 18 may be provided through other physical restraints in the tool. For example, in the embodiment shown in FIGS. 1–6, the end of the left jaw 50 is provided with a lower corner 72 that, for certain generally smaller size clips, will "bottom" against the cam surface 70 to stop further separation of the tongue and the upper leg prior to over-stressing the connection between the tongue and the lower leg 20. The corner 72 is also preferably positioned to engaging the cam surface prior to the tab, so as to protect the tab from damage, in the event the handles are squeezed together without a clip being located between the jaws, and particularly when the pivot is located at 47. In addition, the handles 38 and 40 are provided with off-set surfaces 74 and 76, respectively, positioned to limit the closure of the handles for generally smaller clips with the pivot at 45. Further, the right jaw 48 is provided with a bend generally indicated as 78 (FIG. 5) at which further relative sliding between the cam surface 70 and the base of the clip is physically precluded.

Tools according to the invention may also be provided for use in cramped spaces and locations with limited access to the clip location on the sheet metal 14. The tool 10 (FIGS. 1–6) may be used for installation and removal of clips 12 for which access is generally available, or is at least available from the lower leg 20 side of the clip. In an alternate embodiment (not shown), the handles 38, 40 of the tool 10 extend generally toward the left, with the configuration and relationship between the jaws and the pivot connection remaining unaltered, for installation and removal clips for which access is available only from the direction of the open end of the clip, i.e., approaching from the left as viewed in FIGS. 4–6.

Figure 7:
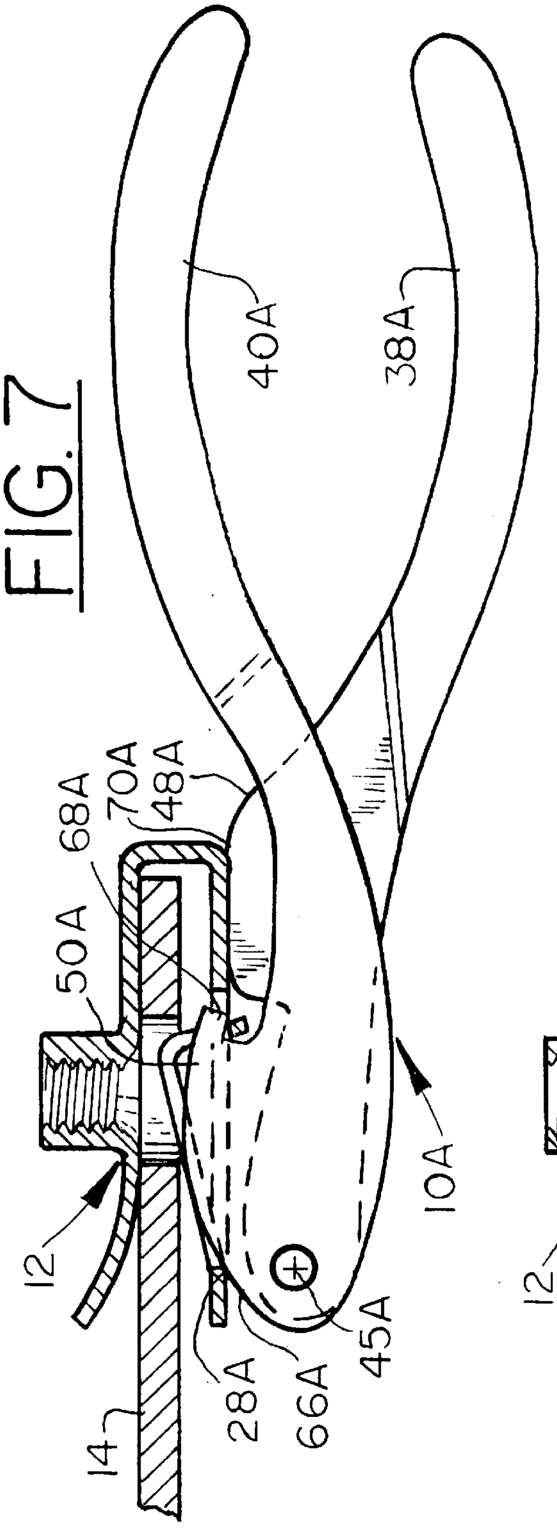
FIGS. 7 and 8 are front views of an alternate embodiment tool according to the present invention, and showing two successive views during removal of a fastener clip.
Figure 8:
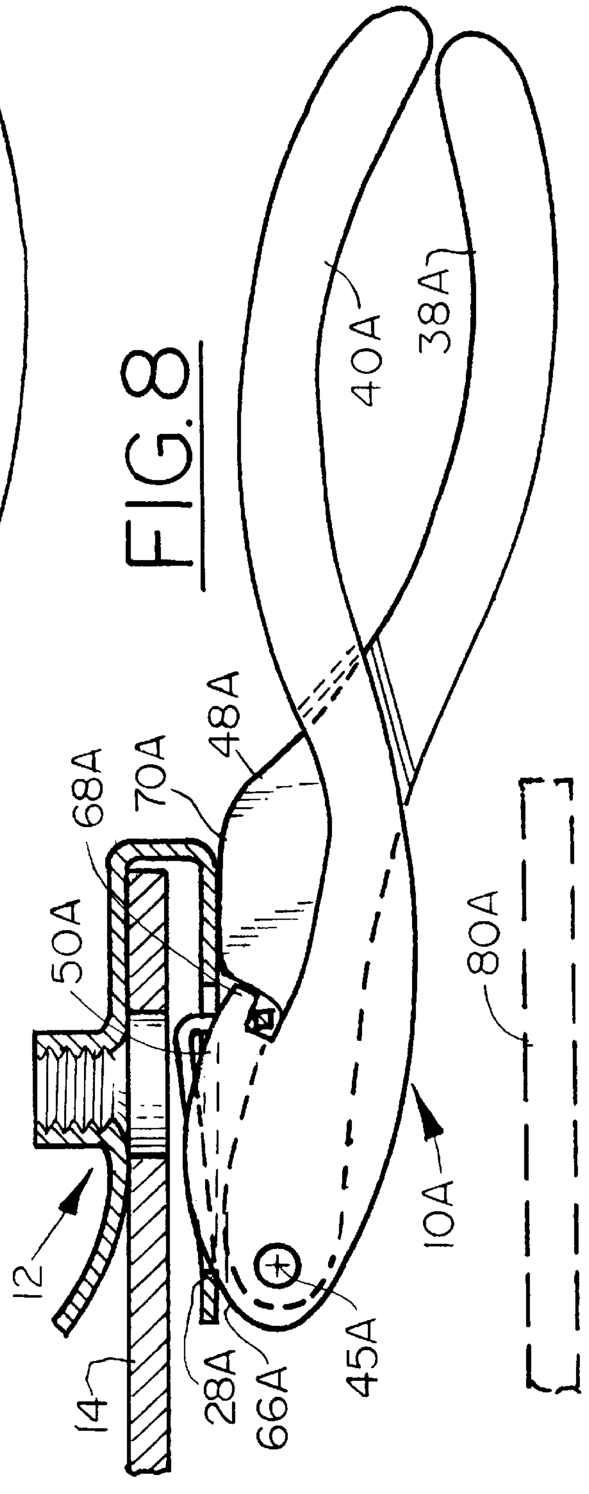

In an alternate embodiment shown in FIGS. 7 and 8, the tool 10A may be used for installation and removal of a clip 12 for which access is restricted except approaching from the closed end of the clip, such as if an object 80A is positioned as shown in dashed lines in FIG. 8 in relation to the clip location on the sheet metal 14. In carrying out the invention in this alternate embodiment, the jaws 48A and 50A are located between the pivot connection 45A and the handles 38A and 40A. The jaw 50A is provided with a fulcrum-establishing surface 66A and a tongue-engaging tab 68A corresponding to surface 66 and tab 68 of jaw 50, and the jaw 48A is provided with a cam-supporting surface 70A corresponding to surface 70 of jaw 48. As will be apparent from considering FIGS. 7 and 8 showing the tool and clip prior to and after removal of the tongue 22 from the opening 34 in the sheet metal 14, with certain modifications discussed below, the general structural and operational relationships between the jaws 48A and 50A and the clip 12 remain generally unchanged as compared with jaws 48 and 50 of tool 10. The surface 70A supports the closed end 16 of the clip, and the tab 68A engages the free end 26 of the tongue 22 and pivots about a fulcrum at 28A to separate the tongue and the upper leg as the handles 38A and 40A are squeezed together.

In a preferred embodiment of the tool 10A, the shape, size, orientation and dimensional relationship of the fulcrum-establishing surface 66A and the tab 68A are established such that the tab 68A imparts a force on the free end portion 26 of the tongue 22 (as the tab pivots and draws the tongue from the sheet metal) that either (i) is directed perpendicular to the cam surface 70A (i.e., perpendicular to the plane extending through the lower leg), or (ii) includes a lateral force vector component directed generally toward the fulcrum 28A, but not directed away from the fulcrum. As a result, the tool 10A provides an alternate means for clamping the clip in the tool without the need to form a curvature on the cam surface 70A, and is most useful in those instances where the other advantages of the curved cam surface 70 are not of substantial consideration such as for use with larger clips where over-stressing the tongue-lower leg junction is not of substantial concern.

Figure 9:
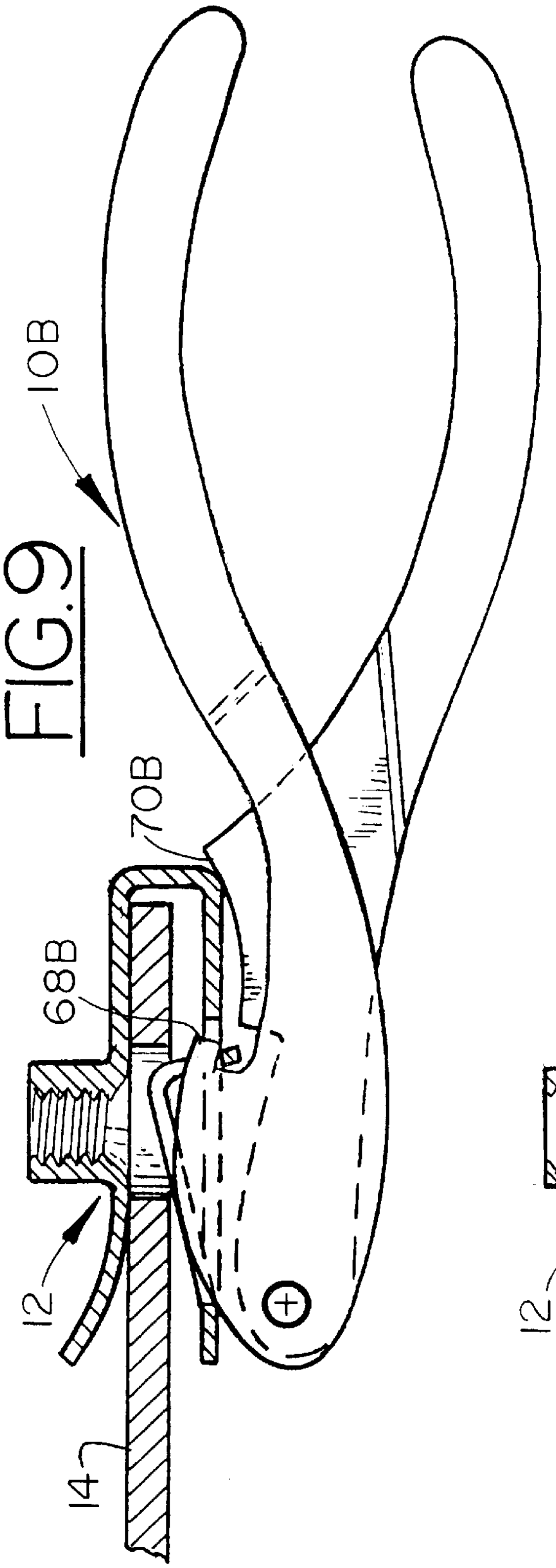
FIGS. 9 and 10 are views similar to FIGS. 7 and 8 of another alternate embodiment.
Figure 10:
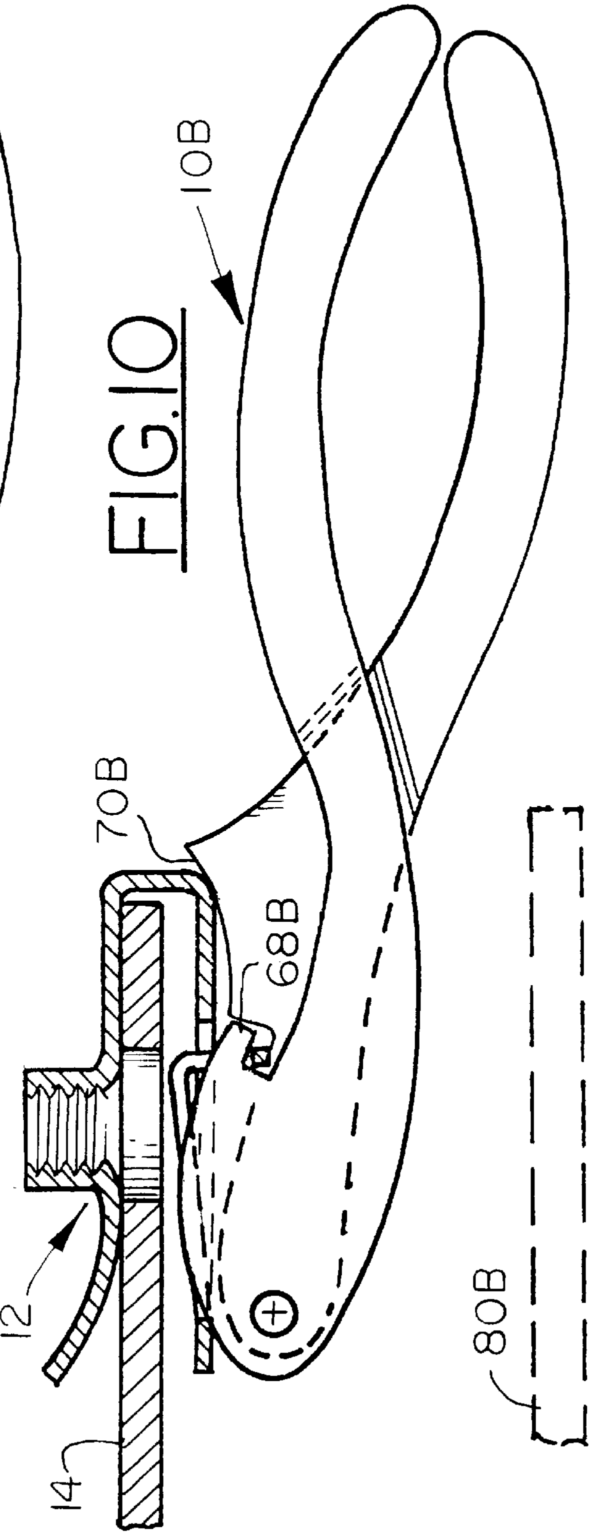

In contrast, another alternate tool 10B shown in FIGS. 9 and 10 is generally the same as tool 10A of FIGS. 7 and 8, but includes a curved cam surface 70B, and associate tab 68B for providing a lateral force directed toward the cam surface 70 and clamping the clip between the jaws such as described in connection with the tool 10.

Figure 11:
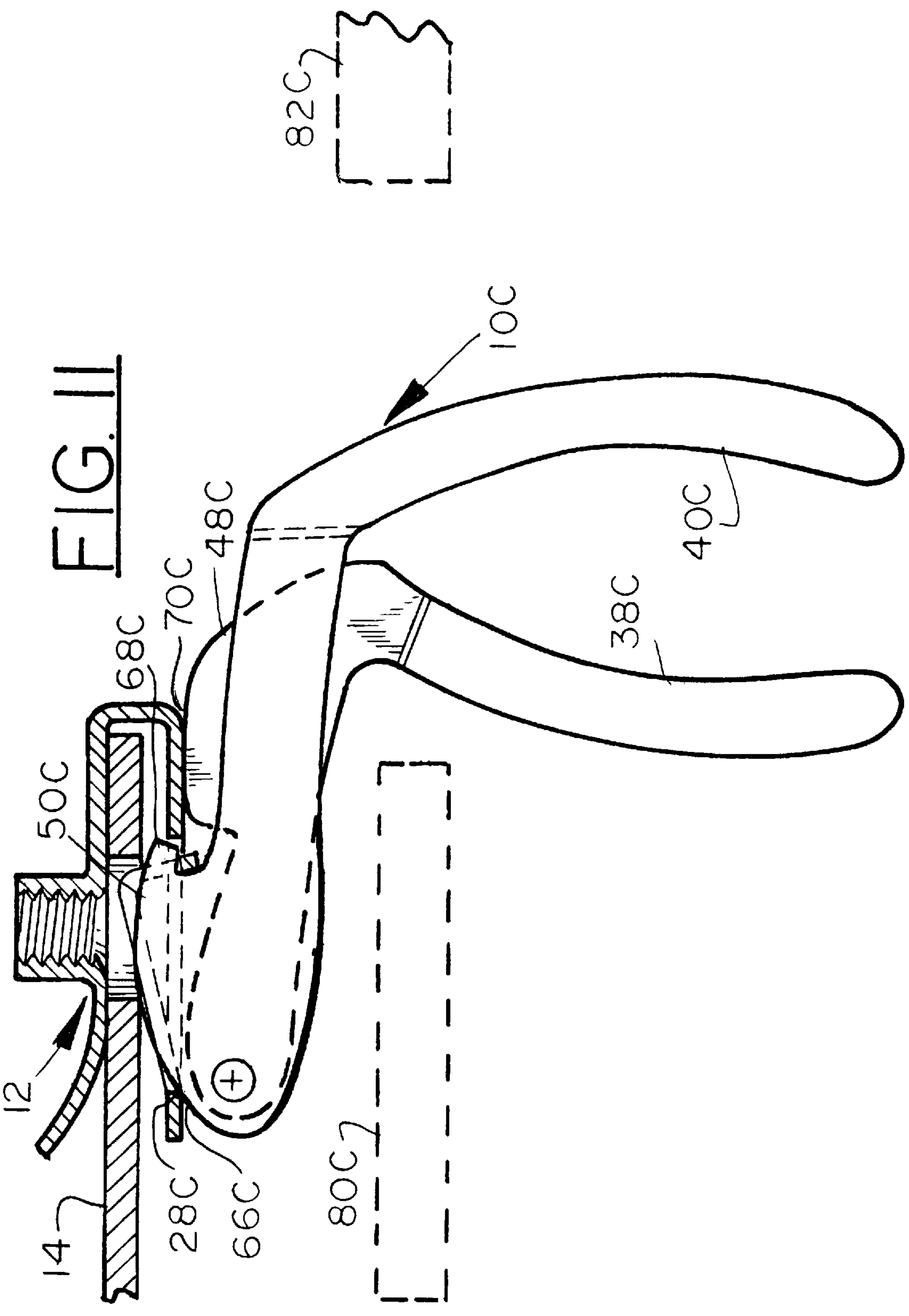
FIG. 11 is a view similar to FIG. 7 of yet another alternate embodiment of a hand tool according to the invention.

In yet another alternate embodiment shown in FIG. 11, the tool 10C may be used for installation and removal of a clip 12 for which access is restricted except for approaching from the lower leg side of the clip location but at an offset angle, such as if objects 80C and 82C are positioned as shown in dashed lines in relation to the clip location on the sheet metal 14. In this instance, the handles 38C and 40C are offset at the desired angle from jaws 48C and 50C which are substantially identical to jaws 48A and 50A of tool 10A.

It is also noted that, because tools according to the invention effect bending or pivoting at the integral junction between the lower leg and the tongue for separation of the tongue and the clip body, the force needed to effect such separation is the same resistance to bending that is overcome when the clips are manually pushed into position on the sheet metal, and is thus relatively small. Accordingly, the length of the tool handles can be made relatively small for access into cramped quarters.

These and other alternate embodiments are contemplated within the scope of the invention. For example, a tool adapted for access to the clip location from the upper leg 18 side of the clip may be provided turning the handles 38C and 40C approximately 180 degrees from the orientation shown in FIG. 11. Although the invention is generally shown and primarily described herein in connection with hand tools, alternate tool embodiments with mechanized jaw actuation means other than manually operable handles will be provided by those skilled in the art. And although U-nut fastener clips are shown in the drawings and generally discussed herein, it will be apparent that tools according to the invention may be adapted for use with fastener clips of other configurations.

From the foregoing, it will be apparent that the present invention brings to the art a new and improved tool to assist in the installation and removal of fastener clips. By virtue of opposing jaws (i) provided with (a) means for establishing a fulcrum with the connected end portion of the tongue, (b) means for grabbing the free end portion of the tongue, and (c) means for supporting the opposite end portion of the lower leg; and (ii) operably connected to effect and maintain separation of the tongue and the upper leg, and therefore maintain a clearance condition between the clip and the edge of the sheet material, as the jaws approach one another; fastener clips may be more quickly and easily installed and removed as compared with prior tools and methods associated with the installation and removal of such clips. Moreover, in the embodiment of a pliers-like hand tool, a tool according to the invention provides for quick and easy one-handed installation and removal of such fastener clips.

I claim:

1. A tool adapted for installation and removal of clips of the type having (A) a body comprising an end portion and upper and lower leg portions cantilevered therefrom, said leg portions being spaced to straddle the edge of a sheet of material, and (B) a cantilevered tongue having (i) an end portion resiliently connected to the lower leg portion of the clip, (ii) a free end portion, and (iii) a central portion extending toward said upper leg portion to engage and assist in retaining the clip on the sheet of material, said tool comprising:

tab means for engaging the free end portion of the tongue;

first and second means for supporting the lower leg portion on generally opposite sides of the free end portion of the tongue; and means for connecting said engaging means and said supporting means for movement of said engaging means away from the upper leg portion for drawing the free end portion and the central portion of the tongue away from the upper leg portion to provide clearance therebetween for receiving the sheet of material during installation and for ease of removal of the clip.

2. A tool as defined in claim 1 in which said first supporting means includes means (i) connected to said engaging means and (ii) adapted to engage the underside of one of (a) the connected end portion of the tongue and (b) the lower leg portion proximate the connected end portion of the tongue for establishing a fulcrum around which said engaging means is pivotable away from the upper leg portion.

3. A tool as defined in claim 2 in which said second supporting means includes a cam surface for slidably engaging the underside of the lower leg portion of the clip as said engaging means pivots around said fulcrum and draws the tongue away from the upper leg portion of the clip.

4.A tool as defined in claim 2 in which said connecting means pivotally connects said second supporting means and said engaging means for movement of said engaging means generally toward said second supporting means as said engaging means draws the free end portion of the tongue away from the upper leg portion for trapping the clip between said engaging means and said second supporting means during installation and removal of the clip.

5. A tool as defined in claim 4 in which said second supporting means includes a cam surface for slidably engaging the underside of the lower leg portion proximate the end portion of the clip as said engaging means draws the tongue from the upper leg portion, said cam surface (i) generally facing said engaging means and (ii) being shaped such that said engaging means drives the end portion of the clip along said cam surface in a direction having a component generally opposite the moving free end portion of the tongue to assist in providing clearance between the central portion of the tongue and the upper leg portion.

6. A tool adapted for installation and removal of clips of the type having (A) a body comprising an end portion and upper and lower leg portions cantilevered therefrom, said leg portions being spaced to straddle the edge of a sheet of material, and (B) a cantilevered tongue having (i) an end portion resiliently connected to the lower leg portion of the clip, (ii) a free end portion, and (iii) a central portion extending toward said upper leg portion to engage and assist in retaining the clip on the sheet of material, said tool comprising:

first and second members; and means for connecting said members;

said first member having (A) an end portion shaped to engage the upper side of the free end portion of the tongue and (B) an outer surface portion (i) between said connecting means and the first member end portion and (ii) adapted to engage the underside of one of (a) the connected end portion of the tongue and (b) the lower leg portion proximate the connected end portion of the tongue for establishing a fulcrum around which the first member end portion is pivotable away from the upper leg portion for drawing the free end portion and the central portion of the tongue away from the upper leg portion of the clip;

said second member having a cam surface for slidably supporting the underside of the lower leg portion as the first member end portion pivots around said fulcrum and draws the tongue away from the upper leg portion of the clip.

7. A tool as defined in claim 6 in which said members are pivotally connected together for movement of said first member end portion generally toward and away from said cam surface such that said first member end portion simultaneously pivots around said fulcrum as it approaches said cam surface for drawing the tongue away from the upper leg portion of the clip.

8. A tool as defined in claim 7 in which said cam surface faces generally toward said first member end portion for trapping the clip therebetween.

9. A tool as defined in claim 8 in which said cam surface extends to a position disposed between said connecting means and said first member end portion.

10. A tool adapted for installation and removal of clips of the type having (A) a body comprising an end portion and upper and lower leg portions cantilevered therefrom, said leg portions being spaced to straddle the edge of a sheet of material, and (B) a cantilevered tongue having (i) an end portion resiliently connected to the lower leg portion of the clip, (ii) a free end portion, and (iii) a central portion extending toward said upper leg portion to engage and assist in retaining the clip on the sheet of material, said tool comprising:

first and second levers having associated first and second handles and first and second jaws, respectively; and means for pivotally connecting the levers together;

said first jaw having an end portion adapted to engage the free end portion of the tongue, and a first support portion between said first jaw end portion and said connecting means for engaging and supporting one of (i) the connected end portion of the tongue and (ii) the lower leg proximate the connected end portion of the tongue to establish a fulcrum around which the first jaw end portion is pivotable;

said second jaw being adapted to further support the clip and to cooperate with the first jaw end portion for grabbing the clip therebetween;

said first jaw being shaped to pivot around said fulcrum for drawing the free end portion of the tongue from the upper leg portion as said handles are squeezed together.

11. A tool as defined in claim 10 in which said second jaw is shaped for slidably supporting the underside of the clip.

12. A tool as defined in claim 11 in which said second jaw is shaped such that the end portion of the clip moves along said second jaw for movement of the upper leg away from the free end portion of the tongue as the handles are squeezed together.

13. A tool as defined in claim 12 in which said connecting means is disposed between said handles and said jaws, said first jaw is shaped to draw the tongue generally toward said connecting means as the handles are squeezed together, and said second jaw is positioned between said first jaw end portion and said connecting means for slidably supporting the underside of the clip as the handles are squeezed together.

14. A tool as defined in claim 12 in which said second jaw is located between said connecting means and said second handle, and said first jaw end portion is disposed between said connecting means and said second jaw.

15. A method for installation and removal of clips of the type having (A) a body comprising an end portion and upper and lower leg portions cantilevered therefrom, said leg portions being spaced to straddle the edge of a sheet of material, and (B) a cantilevered tongue having (i) an end portion resiliently connected to the lower leg portion of the clip, (ii) a free end portion, and (iii) a central portion extending toward said upper leg portion to engage and assist in retaining the clip on the sheet of material, said method comprising the steps of:

(A) providing:

first and second levers having associated first and second handles and first and second jaws, respectively, and means for pivotally connecting said first and second levers together;

said first jaw having a free end portion and having a fulcrum establishing surface for supporting the free end portion of lower leg, said second jaw having a cam surface for supporting the end portion of the clip;

(B) positioning said first jaw with said fulcrum establishing surface engaging the underside of one of (i) the connected end portion of the tongue and (ii) the lower leg proximate the connected end portion of the tongue;

(C) engaging the free end portion of the tongue with said free end portion of said first jaw;

(D) pivoting said second jaw to bring said cam surface into engagement with the underside of the lower leg portion proximate the end portion of the clip; and (E) squeezing the handles to effect separation of the free end portion of the tongue and the upper leg portion.

16. A method as defined in claim 15 in which the free end portion of said first jaw includes a tab, the method further comprising the step of positioning said tab between the free end portion of the tongue and the upper leg of the clip.

17. A method as described in claim 15 in which said cam surface slopes generally upwardly and away from said first jaw such that the end portion of the clip raises relative to the free end portion of the tongue during said squeezing step.

* * * * *